United States Patent [19]

Honsberg

[11] Patent Number: 4,499,244

[45] Date of Patent: Feb. 12, 1985

[54] PROCESS FOR CURING A CHLORINATED POLYOLEFIN IN THE PRESENCE OF ALIPHATIC POLYHYDROXY ALCOHOL

[75] Inventor: Wolfgang Honsberg, Wilmington, Del.

[73] Assignee: E. I. Du Pont de Nemours and Company, Wilmington, Del.

[21] Appl. No.: 527,562

[22] Filed: Aug. 29, 1983

Related U.S. Application Data

[63] Continuation-in-part of Ser. No. 353,361, Mar. 1, 1982, abandoned.

[51] Int. Cl.$^3$ ............................................. C08C 19/00
[52] U.S. Cl. .................................. 525/384; 525/334.1; 525/387
[58] Field of Search ...................... 525/387, 334.1, 345, 525/384

[56] References Cited

U.S. PATENT DOCUMENTS

| | | | |
|---|---|---|---|
| 2,822,353 | 2/1958 | Bankert | 525/385 |
| 2,994,688 | 8/1961 | King | 260/79 |
| 3,169,826 | 2/1965 | Pond et al. | 23/67 |
| 3,483,664 | 12/1969 | Funk et al. | 52/309 |
| 3,522,225 | 7/1970 | Peri et al. | 260/88.2 |
| 3,650,874 | 3/1972 | Job et al. | 161/217 |
| 3,960,821 | 6/1976 | Vogt et al. | 260/79.3 |
| 4,117,189 | 9/1978 | Stinger | 428/323 |
| 4,141,878 | 2/1979 | Coran et al. | 260/33.6 |
| 4,248,764 | 2/1981 | Vaidya | 524/289 |

FOREIGN PATENT DOCUMENTS

| | | | |
|---|---|---|---|
| 004306 | 1/1974 | Japan . | |
| 016028 | 2/1980 | Japan . | |
| 891842 | 3/1962 | United Kingdom . | |
| 1033041 | 6/1966 | United Kingdom | 525/385 |

*Primary Examiner*—Christopher A. Henderson

[57] ABSTRACT

A curable chlorinated polyolefin elastomer composition comprising a basic metal oxide or hydroxide, such as magnesium oxide, an organic peroxide and about 0.2–10 parts per 100 parts elastomer of at least one aliphatic polyhydroxy alcohol having at least two hydroxyl groups in which the hydroxyl groups are on carbon atoms in the 1,2 or 1,3 positions relative to each other and said polyhydroxy alcohol has a molecular weight less than about 300.

8 Claims, No Drawings

PROCESS FOR CURING A CHLORINATED POLYOLEFIN IN THE PRESENCE OF ALIPHATIC POLYHYDROXY ALCOHOL

CROSS-REFERENCE TO RELATED APPLICATION

This is a continuation-in-part of application Ser. No. 353,361 filed Mar. 1, 1982, now abandoned.

BACKGROUND OF THE INVENTION

In industry chlorosulfonated polyolefins are cured with sulfur or compounds that release sulfur when heated. Such processes teach that sulfur accelerators, such as thiuram di- or tetrasulfides, that function as free radical traps are required during curing to prevent decomposition of sulfonyl chloride groups, thus indicating free radicals are detrimental to obtaining an adequately cured product [see King U.S. Pat. No. 2,994,688 and Nersasian, King and Johnson, J. Applied Polymer Science 8, Pages 337-354 (1964)]. Sulfur cures, or more precisely vulcanization, of chlorosulfonated polyolefins often results in adhesion of the rubber to the mold due to sulfur build-up on the mold cavity wall. Also, the sulfurous build-up in the mold cavity can adhere to the rubber article in the mold during vulcanization resulting in formation of discolored areas on the polymer surface. Use of an alternate cure system based on peroxides eliminates these disadvantages and peroxide cures of chlorinated polyethylene or chlorosulfonated polyolefins have been successful commercially. However, they require relatively large amounts of inorganic acid acceptor, for example, magnesium oxide, if satisfactory physical properties are to be obtained. Unfortunately, the high levels of acid acceptors required to promote peroxide cures can detrimentally affect certain properties of the elastomer, for example, compound viscosity and water-resistance. However, the compression set of peroxide-cured chlorinated polyethylene or chlorosulfonated polyethylene is poor when lower levels of acid acceptor are used thus indicating that a high state of cure has not been attained. It is desirable to obtain a high state of cure of chlorinated polyethylene elastomers or chlorosulfonated polyethylene elastomers using lower levels of acid acceptor.

The present invention provides a novel peroxide-curable chlorosulfonated polyethylene elastomer composition or chlorinated polyethylene elastomer composition that reaches a high state of cure by a process in which the chlorinated polyolefin compositions are cured in the presence of certain polyhydroxy alcohols.

SUMMARY OF THE INVENTION

The present invention provides a chlorinated polyolefin elastomer composition having a high state of cure, as indicated by its compression set value. More specifically this invention is directed to a curable chlorinated polyolefin elastomer composition selected from the group consisting of chlorinated polyethylene having 20-50% by weight chlorine and chlorosulfonated polyethylene having 20-50% by weight chlorine and 0.2-1.5% by weight sulfur, a basic metal oxide or hydroxide acid acceptor, an organic peroxide curing agent, and about 0.2-10 parts, preferably 1-3 parts, per 100 parts elastomer of at least one aliphatic polyhydroxy alcohol having at least two hydroxyl groups and in which the hydroxyl groups are on carbon atoms in the 1,2 or 1,3 positions relative to each other and said polyhydroxy alcohol has a molecular weight of less than about 300. Preferably, the polyhydroxy aliphatic alcohol contains 2-6 carbon atoms and the chlorinated polyolefin is chlorosulfonated polyethylene. These elastomers can be used for making hose and belting but are especially useful for jacketing small diameter wire, e.g. automotive ignition wire. The chlorinated polyolefin elastomers are cured by compounding a mixture of the elastomer, a basic metal oxide or hydroxide acid acceptor, an organic peroxide curing agent and about 0.2-10 parts per 100 parts elastomer of at least one aliphatic polyhydroxy alcohol with the proviso that when the elastomer is chlorinated polyethylene about 0.01-0.1 moles of acid acceptor per 100 parts chlorinated polyethylene is added to the mixture and when the elastomer is chlorosulfonated polyethylene about 0.025-0.25 moles of acid acceptor per 100 parts chlorosulfonated polyethylene is added to the mixture, and said polyhydroxy alcohol has at least two hydroxyl groups in which the hydroxyl groups are in the 1,2 or 1,3 positions relative to each other and said polyhydroxy alcohol has a molecular weight of less than about 300 and heating the mixture to a temperature above the decomposition temperature of the peroxide and below the decomposition temperature of the elastomer until the elastomer is cured.

DESCRIPTION OF PREFERRED EMBODIMENTS

The chlorosulfonated polyethylene that is peroxide cured can be any of those well-known elastomers prepared by the reaction of a chlorosulfonating agent, such as a mixture of chlorine and sulfur dioxide gases or sulfuryl chloride, with a saturated hydrocarbon polymer, such as polyethylene, or a copolymer of ethylene with a $C_3$-$C_8$ alpha-olefin. The polyethylene can be either the low density, high pressure type or the high density homo- or copolymer type prepared with a coordination catalyst at lower pressure. The term polyethylene as used herein includes ethylene copolymers that contain up to about 10% by weight of $C_3$-$C_8$ comonomers that are used to make chlorinated polyethylene or chlorosulfonated polyethylene. The number average molecular weight of the chlorosulfonated polyethylene is usually at least 10,000. The chlorosulfonation reaction is controlled to produce a polymer product which contains 20-50 percent by weight chlorine and 0.2-1.5 percent by weight sulfur, the latter being in the form of sulfonyl chloride groups attached to the saturated hydrocarbon chain. Representative polymers of this type are well known and described in, for example, U.S. Pat. Nos. 2,213,786, 2,982,759 and 3,299,014.

The chlorinated polyethylenes used in this invention have 20-50 percent by weight chlorine, and, therefore, the polymers are elastomeric. The chlorinated polyethylenes used in this invention are well-known commercial products made by reacting chlorine gas with polyethylene having a number average molecular weight greater than 10,000.

The polyhydroxy alcohols used as curing aids in the composition of the present invention are added to the elastomer compositions in amounts of about 0.2-10 parts per 100 parts chlorinated polyethylene or chlorosulfonated polyethylene elastomer, and preferably 1-3 parts per 100 parts chlorinated polyethylene or chlorosulfonated polyethylene elastomer. If less than about 0.2 parts per 100 parts elastomer of polyhydroxy alcohol is used, no significant effect is seen in the state of cure of the elastomer and large amounts of acid acceptors must be used in such situations to provide a satisfactory degree of cure, and, if more than about 10 parts polyhydroxy alcohol is used per 100 parts elastomer, no further significant beneficial effects result. The polyhydroxy alcohols are aliphatic alcohols and contain hydroxyl groups on carbon atoms in the 1,2 or 1,3 positions relative to each other and have molecular weights less than about 300. The polyhydroxy alcohols used in the invention can be substituted with various groups such as alkoxy or carboalkoxy radicals, usually having 1–18 carbons atoms in the alkoxy radical. The molecular weight requirements pertain to the polyhydroxy alcohol only and not its equivalent ester- or ether-forming derivatives. Substitution of such radicals on the polyhydroxy alcohol does not interfere with peroxide curing. Preferably the aliphatic polyhydroxy alcohols contain 2 to 6 carbon atoms. Polyhydroxy alcohols that can be used include 2,2-dimethyl-1,3-propanediol, ethylene glycol, glycerol, 1,2-propanediol, dipentaerythritol, and pentaerythritrol available as PE-200, a technical grade sold by Hercules, Inc., pentaerythritol mono- and distearate, mono- and dilaurate, mono- and dioleate and mono- and dipalmitate.

Organic peroxides used to cure elastomers can be used in this invention to cure the chlorinated polyethylene or chlorosulfonated polyethylene elastomers. Such peroxide curing agents are well known in the art and include: 2,5-dimethyl-2,5-di-(t-butylperoxy)hexyne-3; 2,5-dimethyl-2,5-di-(t-butylperoxy)hexane; di-t-butylperoxide; 2,5-di-(t-amylperoxy)-2,5-dimethyl hexane; 2,5-di(t-butylperoxy)-2,5-diphenyl hexane; 2,5-di(t-butylperoxy)-2,2,5-dicyclohexyl hexane; bis(alpha-methylbenzyl)peroxide, also called dicumyl peroxide; and dimethyl-benzyl-t-butyl peroxide; and bis-(t-butyl-peroxy)-diisopropylbenzene. Dicumyl peroxide is preferred because of its ready availability and cost. Generally, the amount of peroxide curing agent added to the chlorinated polyolefin elastomer is about 2 to 8 parts peroxide per 100 parts elastomer and, preferably 3 to 4 parts per 100 parts elastomer. The process is conducted without employing an organic sulfur-containing curing agent.

A conventional basic metal oxide or hydroxide acid acceptor is added to the chlorinated polyethylene or chlorosulfonated polyethylenee compositions that are to be cured. The acid acceptor has a stabilizing effect on the composition because hydrochloric acid (and sulfur acids in the case of chlorosulfonated polyethylene) that is generated during curing is substantially neutralized by the inorganic metal oxides or hydroxides. The metal oxides and hydroxides that are generally used are those of magnesium, calcium or lead. Magnesium oxide, calcium oxide, lead oxide and calcium hydroxide are preferred, especially magnesium oxide. The amount of acid acceptor varies depending on the particular polyhydroxy alcohol that is used in the composition and the chlorinated polyolefin to be cured. Generally, only about 0.025–0.25 moles of acid acceptor per 100 parts chlorosulfonated polyethylene is added to the composition and preferably about 0.05–0.15 moles of acid acceptor per 100 parts of chlorosulfonated polyethylene is added to the composition to obtain a satisfactory cure. When chlorinated polyethylene is cured, generally, the amount of acid acceptor used is about 0.01–0.1 moles per 100 parts of chlorinated polyethylene, preferably about 0.025–0.075 moles per 100 parts chlorinated polyethylene. As a rule the higher the amount of polyhydroxy alcohol added to the composition, the lower the amount of acid acceptor which can be used. Low levels of acid acceptor result in better processing of the elastomer due to lower compound viscosity.

Optionally, in addition to the peroxide curing agent a conventional coagent can be present in the elastomer composition, generally in amounts up to 6 parts per 100 parts chlorinated polyolefine, usually about 1 to 4 parts per 100 parts chlorinated polyolefin elastomer is adequate. These coagents are polyunsaturated compounds that cooperate with the peroxide curing agent to more efficiently use the peroxide. Generally, the coagents are organic compounds containing at least one, preferably two or more, aliphatic unsaturated groups, preferably allyl. Representative coagents that can be used include triallyl cyanurate, diallyl maleate and diallyl terephthalate.

The chlorinated polyethylene or chlorosulfonated polyethylene composition can, and usually does, contain conventional fillers, such as carbon black, calcium carbonate, clay, silica, hydrated alumina and the like; pigments such as titanium dioxide; and stabilizers such as dialkylthiodipropionate and thiodiethylene bis[3,5-di-t-butyl-4-hydroxyhydrocinnamate], in varying amounts.

The invention is illustrated by the following examples in which the proportions are given in parts by weight unless otherwise indicated.

EXAMPLES 1–22 INCLUDING COMPARATIVE EXAMPLES

One hundred parts of curable chlorosulfonated polyethylene containing, by weight, 35% Cl, 1% S is compounded on a two-roll mill with the following ingredients charged to the mill: 40 parts SRF Black, 3.2 parts dicumyl peroxide, 4 parts triallylcyanurate and metal oxide or hydroxide acid acceptor and polyhydroxy alcohol as indicated in the table below. The temperature of the mix during compounding is held below about 60° C. and the ingredients are uniformly mixed in about 4 minutes. The compounded stock is removed from the mill, cured for 30 minutes at 160° C., and tested as indicated. The test data show that the peroxide-cured chlorosulfonated polyethylenes that are cured in the presence of an aliphatic polyhydroxy alcohol have excellent compression set and other satisfactory physical properties thus indicating a tight cure.

TABLE I

| | \multicolumn{10}{c}{PARTS PER 100 RUBBER} |
| | 1 | 2 | 3 | 4 | 5* | 6 | 7 | 8* | 9 | 10 |
| --- | --- | --- | --- | --- | --- | --- | --- | --- | --- | --- |
| INGREDIENTS | | | | | | | | | | |
| Magnesium Oxide | 5$^a$ | 5$^a$ | 2.5$^a$ | 2.5$^a$ | 5$^a$ | 5$^a$ | 5$^a$ | 10$^a$ | 10$^a$ | 10$^a$ |
| Magnesium Hydroxide | | | | | | | | | | |
| Calcium oxide | | | | | | | | | | |
| Calcium hydroxide | | | | | | | | | | |
| Lead oxide | | | | | | | | | | |
| Pentaerythritol | 3 | | 2 | 3 | | 1 | 2 | — | 1 | 2 |

TABLE I-continued

PARTS PER 100 RUBBER

|  | | | | | | | | | | |
|---|---|---|---|---|---|---|---|---|---|---|
| (PE-200) | | | | | | | | | | |
| 2,2-Dimethyl-1,3-propanediol | | 4.6 | | | | | | | | |
| Ethylene glycol | | | | | | | | | | |
| Glycerol | | | | | | | | | | |
| Mooney Scorch[1] | | | | | | | | | | |
| Original | | | | | | | | | | |
| Minimum | 25 | 24 | 20 | 21.5 | 22 | 24 | 23 | 29 | 23 | 26 |
| 10 Point Rise | >30 | 30 | >30 | >30 | >30 | >30 | >30 | >30 | >30 | >30 |
| Stress-Strain-Properties (Cured 30 min/160° C.) | | | | | | | | | | |
| $M_{100}$ (MPa)[2] | 13.4 | 3.1 | 2.2 | 3.4 | 1.7 | 2.2 | 6.9 | 2.8 | 6.9 | 16.9 |
| $M_{200}$ (MPa)[2] | — | 10.3 | 5.2 | 10.0 | 2.8 | 5.3 | 21.0 | 5.9 | 20.3 | — |
| $T_B$ (MPa)[2] | 21.7 | 19.0 | 13.6 | 17.9 | 5.5 | 12.4 | 24.5 | 12.4 | 23.8 | 23.1 |
| $E_B$ (%) | 140 | 290 | 535 | 335 | 800 | 565 | 230 | 640 | 230 | 135 |
| Compression Set[3] | | | | | | | | | | |
| % (22 hrs/70° C.) | 13.5 | 27.5 | 35.5 | 22 | 87.5 | 44.5 | 16 | 52.5 | 16.5 | 10 |
| % (22 hrs/121° C.) | 26 | 45 | 72.5 | 51 | 112 | 82.5 | 38.5 | 77.5 | 38.5 | 29 |

|  | 11 | 12* | 13 | 14 | 15* | 16 | 17* | 18 | 19 | 20 | 21 | 22 |
|---|---|---|---|---|---|---|---|---|---|---|---|---|
| INGREDIENTS | | | | | | | | | | | | |
| Magnesium Oxide | 10$^a$ | | | | | | | 5 | 5 | 5 | | |
| Magnesium Hydroxide | | 7.2$^b$ | 7.2$^b$ | | | | | | | | | |
| Calcium oxide | | | | 7.1$^c$ | | | | | | | 7.1$^c$ | |
| Calcium hydroxide | | | | | 9.2$^d$ | 9.2$^d$ | | | | | | |
| Lead oxide | | | | | | | | | | | 10$^e$ | 20$^e$ |
| Pentaerythritol (PE-200) | 3 | | 2 | 4 | | 2 | | | | | | |
| 2,2-Dimethyl-1,3-propanediol | | | | | | | | | | | | |
| Ethylene glycol | | | | | | | | | | | | |
| Glycerol | | | | | | | | 2 | 2 | 4 | 4 | 6 |
| Mooney Scorch[1] | | | | | | | | | | | | |
| Original | | | | | | | | | | | | |
| Minimum | 26 | | | | | | | | | | | |
| 10 Point Rise | >30 | | | | | | | | | | | |
| Stress-Strain-Properties (Cured 30 min/160° C.) | | | | | | | | | | | | |
| $M_{100}$ (MPa)[2] | 19.3 | 1.7 | 8.6 | 1.7 | 2.7 | 10.0 | 1.4 | 15.2 | 15.2 | 13.8 | 12.7 | 9.6 |
| $M_{200}$ (MPa)[2] | — | 2.4 | — | 6.5 | 4.8 | — | 2.0 | — | — | 23.5 | — | — |
| $T_B$ (MPa)[2] | 25.9 | 6.2 | 23.4 | 8.6 | 19.0 | 20.7 | 7.2 | 26.2 | 24.8 | 24.2 | 25.5 | 23.8 |
| $E_B$ (%) | 135 | 850 | 230 | 780 | 410 | 150 | 800 | 140 | 140 | 145 | 170 | 190 |
| Compression Set[3] | | | | | | | | | | | | |
| % (22 hrs/70° C.) | 8 | 92 | 17 | 80 | 27 | 9 | 83 | 11 | 10 | 28 | 13 | 23 |
| % (22 hrs/121° C.) | 29 | | | | | | | | | | | |

[1] ASTM D-1646
[2] ASTM D-412
[3] ASTM D-395
$^a$ 2.5, 5 and 10 parts MgO are equivalent to 0.06, 0.12 and 0.25 moles MgO respectively.
$^b$ Equivalent to 0.12 moles Mg(OH)$_2$
$^c$ Equivalent to 0.13 moles CaO
$^d$ Equivalent to 0.12 moles Ca(OH)$_2$
$^e$ 10 and 20 parts PbO are equivalent to 0.045 and 0.09 moles PbO, respectively
*Comparative Example

EXAMPLES 23–30 INCLUDING COMPARATIVE EXAMPLES

One hundred parts of a curable chlorinated polyethylene elastomer containing 35% Cl by weight is compounded on a two-roll mill with the following ingredients charged to the mill: 40 parts SRF Black, 2.4 parts dicumyl peroxide, 1 part triallylcyanurate and a metal oxide or hydroxide acid acceptor and a polyhydroxy alcohol as indicated in the table below. The temperature of the mix during compounding is held below about 60° C. and the ingredients are uniformly mixed in about 4 minutes. The compounded stock is removed from the mill, cured for 30 minutes at 160° C. and tested as indicated. The test data show that the peroxide cured chlorinated polyethylenes that are cured in the presence of an aliphatic polyhydroxy alcohol have excellent compression set and other satisfactory physical properties thus indicating that a high degree of cure was attained.

TABLE II

|  | 23* | 24 | 25* | 26 | 27* | 28 | 29* | 30 |
|---|---|---|---|---|---|---|---|---|
| Magnesium hydroxide | — | — | — | — | 1.4$^a$ | 1.4$^a$ | 0.7$^a$ | 0.7$^a$ |
| Calcium Oxide | 1.4$^b$ | 1.4$^b$ | 1.5$^b$ | 11.5$^b$ | — | — | — | — |
| Pentaerythritol (PE-200) | — | 2 | — | — | — | 1 | — | 2 |
| Glycerol | — | — | — | 1 | — | — | — | — |
| Stress-Strain-Properties (Cured 30 min/160° C.) | | | | | | | | |

TABLE II-continued

|  | 23* | 24 | 25* | 26 | 27* | 28 | 29* | 30 |
|---|---|---|---|---|---|---|---|---|
| $M_{100}$ (MPa)[1] | 4.1 | 7.6 | 4.5 | 5.2 | 4.3 | 5.9 | 3.4 | 5.2 |
| $M_{200}$ (MPa)[1] | 7.2 | 19.0 | 8.6 | 12.7 | 9.0 | 14.3 | 11.8 | 17.6 |
| $T_B$ (MPa)[1] | 14.5 | 21.4 | 15.5 | 19.3 | 15.5 | 18.7 | 15.8 | 22.8 |
| $E_B$ (%) | 440 | 235 | 405 | 295 | 265 | 265 | 300 | 245 |
| Compression Set[2] |  |  |  |  |  |  |  |  |
| % (22 hrs/70° C.) | 41 | 19 | 50 | 26 | 36 | 21 | 19 | 13 |

[1] ASTM D-412
[2] ASTM D-395
[a] 0.7 and 1.4 parts Mg(OH)$_2$ are equivalent to 0.012 and 0.024 moles Mg(OH)$_2$, respectively.
[b] 1.4 and 1.5 parts CaO are equivalent to 0.025 and 0.027 moles CaO respectively.
*Comparative Examples

EXAMPLES 31–38 INCLUDING COMPARATIVE EXAMPLE

The procedure described above in examples 23–30 is repeated except that magnesium oxide is used as the acid acceptor, and ethylene glycol and glycerol are used in the amounts indicated as the polyhydroxy alcohols.

TABLE III

|  | 31* | 32 | 33 | 34 | 35 | 36 | 37 | 38 |
|---|---|---|---|---|---|---|---|---|
| Magnesium oxide (Maglite D) | 1[a] | 1[a] | 1[a] | 1[a] | 1[a] | 1[a] | 1[a] | 1[a] |
| Pentaerythritol (PE-200) | — | 0.5 | 1 | 2 | — | — | — | — |
| Glycerol | — | — | — | — | 0.5 | 1 | 2 | — |
| Ethylene glycol | — | — | — | — | — | — | — | 1 |
| Stress-Strain-Properties (Cured 30 min at 160° C.) |  |  |  |  |  |  |  |  |
| Original |  |  |  |  |  |  |  |  |
| $M_{100}$ (MPa)[1] | 4.5 | 5.9 | 6.3 | 7.4 | 5.6 | 6.3 | 7.1 | 6.5 |
| $M_{200}$ (MPa)[1] | 9.6 | 14.1 | 15.5 | 17.9 | 13.8 | 16.0 | 17.9 | 15.9 |
| $T_B$ (MPa)[1] | 16.5 | 17.9 | 19.3 | 20.7 | 19.3 | 20.3 | 20.3 | 20.0 |
| $E_B$ (%) | 345 | 245 | 245 | 235 | 270 | 250 | 225 | 260 |
| Compression Set[2] |  |  |  |  |  |  |  |  |
| % (22 hrs. at 70° C.) | 34 | 26 | 22 | 20 | 23 | 24 | 19 | 22 |

[1] ASTM D-412
[2] ASTM D-395
[a] Equivalent to 0.025 moles MgO
*Comparative Example

I claim:

1. A process for curing a chlorinated polyolefin elastomer selected from the group consisting of chlorinated polyethylene having 20–50% chlorine by weight and chlorosulfonated polyethylene having 20–50% chlorine by weight and 0.2–1.5% sulfur by weight, by compounding a mixture of said elastomer, a basic metal oxide or hydroxide acid acceptor, an organic peroxide curing agent, and about 0.2–10 parts per 100 parts elastomer of at least one aliphatic polyhydroxy alcohol with the proviso that when the elastomer is chlorinated polyethylene about 0.01–0.1 moles of acid acceptor per 100 parts chlorinated polyethylene is added to the mixture and when the elastomer is chlorosulfonated polyethylene about 0.025–0.25 moles of acid acceptor per 100 parts chlorosulfonated polyethylene is added to the mixture, and said polyhydroxy alcohol has at least two hydroxyl groups in which the hydroxyl groups are in the 1,2 or 1,3 positions relative to each other and said polyhydroxy alcohol has a molecular weight of less than about 300 and heating the mixture to a temperature above the decomposition temperature of the peroxide and below the decomposition temperature of the elastomer until the elastomer is cured.

2. A process of claim 1 where the chlorinated polyolefin elastomer is chlorosulfonated polyethylene.

3. A process of claim 1 where the chlorinated polyolefin elastomer is chlorinated polyethylene.

4. A process of claims 1, 2 or 3 where the polyhydroxy alcohol contains 2–6 carbon atoms.

5. A process of claims 1, 2 or 3 where the acid acceptor is an oxide or hydroxide of magnesium.

6. A process of claims 1, 2 or 3 where the polyhydroxy alcohol is ethylene glycol.

7. A process of claims 1, 2 or 3 where the polyhydroxy alcohol is glycerol.

8. A process of claims 1, 2 or 3 where the polyhydroxy alcohol is pentaerythritol.

* * * * *